(12) United States Patent
McFerrin et al.

(10) Patent No.: US 10,262,151 B2
(45) Date of Patent: Apr. 16, 2019

(54) USER-AGNOSTIC BACKEND STORAGE FOR CLOUD-BASED APPLICATIONS

(71) Applicant: Citrix Systems, Inc., Fort Lauderdale, FL (US)

(72) Inventors: Steven Dale McFerrin, Boynton Beach, FL (US); Gustavo Teixeira Pinto, Boynton Beach, FL (US); Philip John Wiebe, Davie, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 555 days.

(21) Appl. No.: 14/644,926

(22) Filed: Mar. 11, 2015

(65) Prior Publication Data

US 2015/0261971 A1    Sep. 17, 2015

Related U.S. Application Data

(60) Provisional application No. 61/954,197, filed on Mar. 17, 2014.

(51) Int. Cl.
  *G06F 21/62* (2013.01)
  *H04L 29/06* (2006.01)

(52) U.S. Cl.
  CPC .......... *G06F 21/6218* (2013.01); *H04L 63/10* (2013.01)

(58) Field of Classification Search
  CPC .................. G06F 17/30958; H04L 67/1097
  USPC ......................................................... 707/781
  See application file for complete search history.

(56) References Cited

U.S. PATENT DOCUMENTS

| | | | |
|---|---|---|---|
| 2013/0097275 A1* | 4/2013 | Wofford, IV | G06F 3/0605 709/213 |
| 2014/0282900 A1* | 9/2014 | Wang | H04L 63/04 726/4 |
| 2014/0365523 A1 | 12/2014 | Wagner et al. | |
| 2015/0193347 A1* | 7/2015 | Kluesing | G06F 17/30132 711/137 |

* cited by examiner

*Primary Examiner* — Cheyne D Ly
(74) *Attorney, Agent, or Firm* — BainwoodHuang

(57) ABSTRACT

A data storage service is provided in the cloud agnostically to any user account or identity through the use of data storage containers, which are accessed using unique identifiers and independently of any user-based context. The data storage service runs in a backend system and creates a data storage container along with a unique ID that identifies the data storage container from among multiple such containers. Once a cloud-based application receives the unique ID, the cloud-based application may itself assign the data storage container to any user, or to no user, in accordance with the cloud-based application's own programming.

17 Claims, 6 Drawing Sheets

USER-AGNOSTIC BACKEND STORAGE FOR CLOUD-BASED APPLICATIONS

CROSS-REFERENCE TO RELATED APPLICATIONS

Priority is claimed to U.S. Provisional Patent Application No. 61/954,197, filed Mar. 17, 2014, the contents and teachings of which are incorporated by reference herein in their entirety.

BACKGROUND

Cloud-based applications are software applications that employ services available over the Internet or over some other network to assist the applications in performing their tasks. In a typical scenario, a user installs a frontend client (e.g., an "app") on a client device, which connects to a backend server over the Internet. The frontend client typically manages a user interface and performs local processing on the client device, whereas the backend server may access large databases, store user data, and perform computationally intensive tasks. Users currently enjoy a wide variety of cloud-based applications, including applications for data storage, video streaming, web conferencing, mapping, banking, and many others.

A common type of cloud-based application provides user data storage in the cloud. For example, a user installs a data storage client on the user's device and designates a local folder for storing files. Any time the user adds a file to the local folder, the data storage client automatically uploads the file to a backend system running in the cloud. The user may install a similar data storage client for the same application on other devices, and the backend system coordinates with the different devices to ensure that the devices all share the same files and file versions.

SUMMARY

Software developers often incorporate backend storage services into the cloud-based applications they design. Consider, for example, a password-managing app that runs on a user's smart phone to keep track of the user's login IDs and passwords. The password-managing app collects login information entered by the user and writes the information to a local, encrypted file. The password-managing app may employ backend storage services to store the password file in the cloud, such that the file may be backed-up and synced to the user's other devices.

Unfortunately, conventional cloud storage services require users to create user accounts and to sign onto those accounts prior to using such storage services. Thus, for example, a user of the above-described password-managing app has to sign on to the user's cloud storage service before the password file can be uploaded and stored. This sign-on is in addition to any sign-on required to use the password-managing app itself. Users are therefore inconvenienced because they must obtain and log onto separate accounts to use their apps. Developers may be inconvenienced, as well, because they may be required to include features in their apps that allow users to logon separately to the data storage services. Although it is possible for developers to build their own backend storage solutions, which do not require separate accounts and logons, such solutions are complex and add significantly to the overall effort of developing applications.

In contrast with the above-described conventional approach, an improved technique provides a data storage service in the cloud agnostically to any user account or identity through the use of data storage containers, which are accessed using unique identifiers and independently of any user-based context. In accordance with the improved technique, the data storage service runs in a backend system and creates a data storage container along with a unique ID that identifies the data storage container from among multiple such containers. The data storage service provides the unique ID to a cloud-based application, which may then write data to and/or read data from the data storage container. Once the cloud-based application receives the unique ID, the cloud-based application may itself assign the data storage container to any user, or to no user, in accordance with the cloud-based application's own programming. But any such assignment to a user is made by the cloud-based application at its own option and not by the data storage service. Thus, the improved technique effectively decouples data storage services in the cloud from any user-based context, allowing developers to design applications that include data storage services without having to build their own solutions or to require users to separately log on.

Certain embodiments are directed to a method of managing data storage in a backend system that provides services for supporting cloud-based software applications. The method includes, in response to receiving a request from a cloud-based application, operating control circuitry to direct a data storage service in the backend system to create a data storage container in a set of storage devices, the data storage container (i) providing a logical container for storing data and (ii) having no assignment by the data storage service to any end user of the cloud-based application. The method further includes generating a unique identifier (ID) for identifying the data storage container from among multiple data storage containers in the backend system and providing the unique ID to the cloud-based application to enable the cloud-based application to store and retrieve data from the data storage container using the unique ID.

Other embodiments are directed to a backend server constructed and arranged to perform the method described above. Still other embodiments are directed to a computer program product embodying a non-transitory, computer-readable medium. The non-transitory, computer-readable medium stores instructions, which, when executed on one or more processors of backend system, cause the backend system to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique provides backend data storage services in the cloud agnostically to any user account or identity through the use of data storage containers. The data storage containers are accessed using unique identifiers and independently of any user-based context. The improved technique thus effectively decouples data storage services in the cloud from any user-based context, allowing developers to design applications that include data storage services without having to build their own solutions or require users to separately log on.

Figure 1:
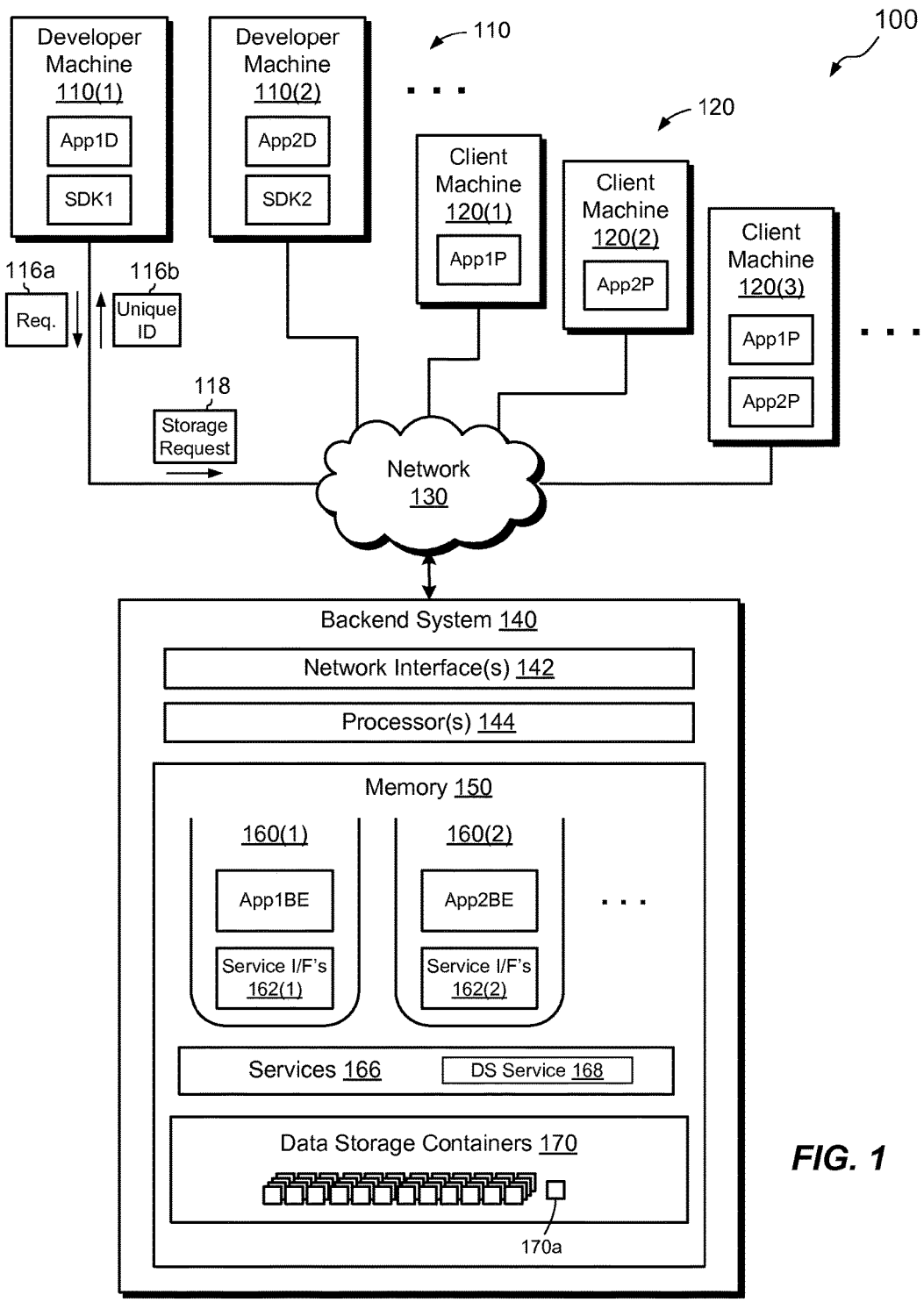
FIG. 1 is a block diagram of an example environment in which embodiments of the invention hereof can be practiced and includes a backend system running multiple application sandboxes.

FIG. 1 shows an example environment 100 in which embodiments of the improved technique hereof can be practiced. Here, developer machines 110 (110(1), 110(2), etc.) and client machines 120 (e.g., 120(1), 120(2), etc.) connect to a backend system 140 over a network 130. Typically, a software developer operates each of the developer machines 110 and an end user operates each of the client machines 120. Each of the developer machines 110 runs a development version of a frontend client (e.g., App1D, App2D), such as a software program or "app," as well as a software development kit (e.g. SDK1, SDK2), which a developer may use for programming the frontend client to access services on the backend system 140. Different SDKs may be provided for different front-end computing platforms (e.g., Windows, OSX, iOS, Android, etc.) and/or for different computer languages (e.g., Java, Ruby, Rails, Python, Node, Objective C, etc.). In some examples, developer machines 110 access backend services directly, e.g., using a REST (Representational State Transfer) interface, without the need for an SDK.

Each of the client machines 120 includes a production version of one or more frontend clients (e.g., App1P, App2P). In this example, App1P is a production version of App1D and App2P is a production version of App2D. Of course, developer machines 110 may also run production versions of client frontends. In addition, any of the machines 110 and 120 may run any number of frontend clients. It should be understood that the arrangement as shown is merely illustrative.

In an example, the backend system 140 provides services both for developing cloud-based applications and for hosting cloud-based applications and features. Thus, the backend system 140 may be used at various times or simultaneously both by developer machines 110 and by client machines 120. The backend system 140 is seen to include one or more network interfaces 142 (e.g., Ethernet and/or Token Ring cards), a set of processors 144 (e.g., one or more processing chips, blades, and/or assemblies), and memory 150. The memory 150 includes both volatile memory (e.g., RAM) and non-volatile memory, such as one or more disk drives, solid state drives, data storage arrays, and the like.

The memory 150 stores software constructs for realizing application sandboxes 160(1), 160(2), etc. (as many as desired), as well as services 166 and data storage containers 170. The data storage containers 170 provide data storage for the above-described first and second cloud-based applications, and, generally, for any cloud-based applications that the backend system 140 supports. A set of storage devices (e.g., disk drives, flash drives, memory chips, etc.) of the memory 150 provide physical media for storing the data storage containers 170.

In an example, each of the application sandboxes 160(1) and 160(2) is dedicated to a respective cloud-based application and operates a respective application backend for supporting the cloud-based application. For example, sandbox 160(1) operates a backend App1BE for supporting a first cloud-based application and sandbox 160(2) operates a backend App2BE for supporting a second cloud-based application. Here, App1BE is the backend that supports frontends App1D and App1P. Likewise, App2BE is the backend that supports frontends App2D and App2P. Note that the backends may be segregated into development and production versions, in a manner similar to that shown for the frontends. In an example, application developers write the application backends either in situ on the backend system 140 (e.g., over a web interface) or on developer machines (e.g., 110). Developers may upload backends written on developer machines to the backend system 140 once the locally-developed backends are ready to be deployed. It should be understood that some cloud-based applications may not require application backends, per se. For example, some frontend clients 110 or 120 may access the services 166 directly over the network 130 without the use of application backends.

As shown, the services 166 include a data storage (DS) service 168. The data storage service 168 manages the creation and destruction of data storage containers 170. The data storage service 168 also manages the storage and retrieval of data to and from the data storage containers 170 and performs other functions. Although this document refers to a data storage service 168 in the singular form, it should be understood such the data storage service 168 may include any number of services, functions, methods, procedures, and so forth, which operate to manage data storage and associated activities. The services 166 and data storage service 168 are so named because they perform services for cloud-based applications and not because they are categorized as "services" according to any particular operating system (e.g., these "services" are required to be Windows services in the Windows operating system). Rather, the backend system 140 may implement the services 166 and 168 in any suitable software construct or constructs.

In the example shown, each of the application sandboxes 160(1) and 160(2) has a respective set of service interfaces, 162(1) and 162(2). Although the services 166 may be common across the entire backend system 140, the service interfaces 162(1) and 162(2) are each particular to a respective sandbox, such that developers can access services within the context of each of the application sandboxes 160(1) and 160(2) as if those services were specific to the respective application.

The developer machines 110 and the client machines 120 may each be implemented with any type of device (or devices) having control circuitry (e.g., processing circuitry and memory), which is provisioned for executing application frontends and communicating over the network 130. The different machines 110 and 120 may be implemented with any type or types of devices, and the types of devices need not be the same. Such devices may be stationary devices (e.g., servers, desktop computers, set top boxes, gaming systems, etc.) or mobile devices (laptops, tablet computers, smart phones, personal readers, etc.). The environment 100 may include any number of developer machines 110 and/or client machines 112, and the environment 100 need not include both types of machines. The network 130 may be realized with any type of network or networks, such as the Internet, a WAN (wide area network), a LAN (local area network), or any other network or combination of networks. The network 130 may be implemented with various technologies, such as with wired and/or wireless technologies, telephone systems, cell phone systems, microwave systems, infra-red systems, and the like.

The backend system 140 may be provided as a server-grade computing system that includes any number of individual computers, networking components, and data storage arrays, which operate together as a single system. However, the server 140 is not limited to large-scale deployments and may be implemented on any scale with any number of computing devices, including with a single computing device. The set of processors 144 and the memory 150 of the backend system 140, within its constituent device or devices, together realize control circuitry, which is constructed and arranged to carry out various methods and functions as described herein. Also, the memory 150 includes a variety of software constructs realized in the form of executable instructions. When the executable instructions are run by the set of processors 144, the set of processors 144 are caused to carry out the operations of the software constructs. Although certain software constructs are specifically shown and described, it is understood that the memory 150 typically includes many other software constructs, which are not shown, such as an operating system and various applications, processes, and daemons. The backend system 140 is amenable to implementation on physical machines as well as on virtual machines.

An example will now be presented for creating a new data storage container 170a in the backend system 140 at the request of the first cloud-based application. Although this example relates to a particular data storage container created at the request of the first cloud-based application, it should be appreciated that this example can be applied more generally to describe the creation of any data storage container 170 by any cloud-based application.

In this example, the data storage service 168 in the backend system 140 receives a request 116a from the first cloud-based application to create a new data storage container 170a. The request 116a may arrive from the frontend client App1D on the first developer machine 110(1), as shown, or from any other instance of App1D, or from any instance of App1P. Alternatively, the request 116a may arrive from the backend App1BE or from any of the services 166, i.e., from a location internal to the backend system 140.

In response to the data storage service 168 receiving the request 116a, the data storage service 168 creates the new data storage container 170a. For example, the data storage service 168 generates metadata for the data storage container 170a and stores such metadata in a database in the backend system, the purpose of the database being to track information about data storage containers.

The data storage container 170a provides a logical container for storing data and has no assignment by the data storage service 168 to any end user of the first cloud-based application. Although the first cloud-based application may certainly have end users (e.g., users of various client machines 120), the data storage service 168 creates the data storage container 170a without any assignment to any end user. For example, the data storage service 168 does not assign the data storage container 170a to any end user account, nor does it store any end user ID in the metadata created for supporting the data storage container 170a. Even if the request 116a arrives from one of the clients 120, which is operated by an end user, the data storage service 168 still does not assign any user ID to the data storage container 170a. Rather, the data storage container 170a is user-agnostic. As far as the data storage service 168 is concerned, no end user owns the data storage container 170a. The data storage container 170a is thus completely independent of any end user, both in its definition and in its access by the data storage service 168. As will be described more fully below, the user-agnostic nature of the data storage container 170a (and, similarly, of all data storage containers 170) confers many advantages both to application developers and to users.

Rather than providing access to the data storage container 170a in connection with any end user, the data storage service 168 instead generates a unique identifier (ID) (e.g., 116b) for the data storage container 170a. The data storage service 168 then proceeds to provide access to the data storage container 170a via the unique ID 116b. Generating the unique ID 116b may be conducted before, after, or simultaneously with the act of creating the data storage container 170a. The unique ID 116b uniquely identifies the data storage container 170a from among other data storage containers in the backend system 140. In an example, the unique ID 116b of the data storage container 170a is unique across all of the cloud-based data services provided by the backend system 140, as well as across any similar backend systems that may coordinate with the backend system 140 to provide cloud-based data services to applications. The unique ID 116b may be generated in any suitable way. For example, the unique ID 116b may be generated as an automatically-incrementing integer, by a hash function, or by any other suitable method.

Once the data storage service 168 has created the unique ID 116b, the data storage service 168 provides the unique ID 116b to the first cloud-based application. For example, the data storage service 168 returns the unique ID 116b to the developer machine 110(1), or, for example, to whichever other machine or software construct originated the request 116a (or to any other designated entity). After the first cloud-based application has received the unique ID 116b, the first cloud-based application may use the unique ID 116b for accessing the data storage container 170a, such as for writing data to the data storage container 170a and/or for reading data from the data storage container 170a.

In an example, the backend system 140 (or a software construct operating therein), receives a storage request 118 from the first cloud-based application. The request 118 specifies a set of data to be stored and the unique ID 116b of the data storage container 170*a*. For example, the frontend client App1D on machine 110(1) sends the storage request 118 to the backend system 140. Upon receiving the storage request 118, the backend system 140, e.g., acting through the data storage service 168, stores the set of data from the request 118 in the data storage container 170*a*. The first cloud-based application may similarly send a read request to the data storage service 168, by specifying the unique ID 116*b* of the data storage container 170*a*, to read data from the data storage container 170*a*. In response, the first cloud-based application may receive back the contents of the data storage container 170*a*.

Providing access to data storage containers 170 and their contents based on unique IDs enables cloud-based applications flexibly to assign data storage containers 170 and their contents to particular end users, to groups of end users, or to no end users at all. Because access to data storage containers is based on access to their respective unique IDs, developers can write their cloud-based applications to provide selected users, or no users, with access to data storage containers at their own option. But granting access to users is done at the application level and not in the data storage services 168 or in the data storage containers themselves, which remain user-agnostic.

Data storage containers need not ever be assigned to any user at all. For example, a cloud-based application may request a new data storage container and proceed to store application settings for the cloud-based application in the newly created data storage container. The application settings may pertain to the application but not to any particular end user of the application. The data storage container storing the application settings may thus never have an assignment to any end user.

In some examples, in addition to being user-agnostic, data storage containers 170 are also application-agnostic. For example, a data storage container need not include in its definition any application-based context. Likewise, the data storage service 168 need not assign the data storage container to any cloud-based application. Rather, the data storage service 168 may flexibly provide the unique ID of a data storage container, upon request, to any number of cloud-based applications, enabling multiple cloud-based applications to share data amongst one another.

It is thus evident from the foregoing that software developers may use the data storage service 168 to provide cloud-based data storage in the applications they design, without requiring such developers to build their own backend storage solutions or requiring users to log on to a separate storage service. Because the data storage service 168 is user-agnostic, it can provide storage containers for use with any applications or users that have the respective unique IDs. The burden and inconvenience to users and developers associated with conventional cloud-based storage solutions are therefore overcome.

Figure 2:
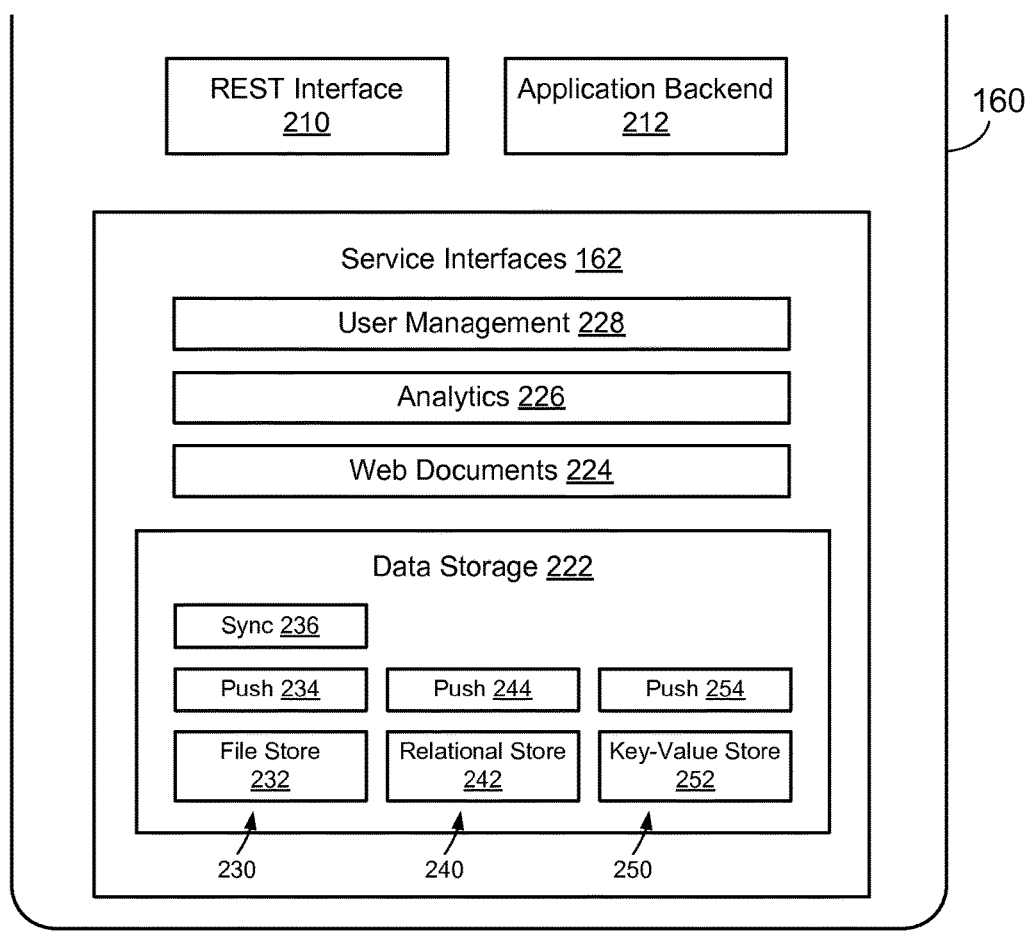
FIG. 2 is a block diagram of an example application sandbox, as shown in FIG. 1.

FIG. 2 shows an example application sandbox 160 in additional detail. The application sandbox 160 may be representative of the application sandboxes 160(1) and 160(2) of FIG. 1. For example, the sandbox 160 includes an application backend 212, which may correspond, for example, to backends App1BE and App2BE of sandboxes 160(1) and 160(2), respectively. The sandbox 160 further includes service interfaces 162, which correspond, for example, to the service interfaces 162(1) and 162(2) as seen in FIG. 1. The application sandbox 160 further includes a REST (Representational State Transfer) interface 210, for communicating with application frontends (e.g., App1D, App1P, App2D, and App2P). In an example, the REST interface 210 exposes an API (application programming interface) for providing the frontends with access to the application backend 212 and to the backend services 166 (FIG. 1), i.e., through the service interfaces 162.

In an example, the application sandbox 160 (or each instance thereof running on the backend system 140) provides backend support for a respective cloud-based application, from the standpoints of both developers and end users. The application sandbox 160 may support multiple instances of the cloud-based application simultaneously, e.g., as a consequence of multiple frontends running on machines 110 and 120.

The service interfaces 162 provide interfaces (e.g., APIs) into the services 166 (FIG. 1) in such a way that the services 166 as accessed through the service interfaces 162 are scoped to the application sandbox 160 and thus to the particular cloud-based application supported by the application sandbox 160. The service interfaces 162 are seen to include, for example, a data storage service interface 222, a web documents service interface 224, an analytics service interface 226, and a user management service interface 228. The service interfaces 222, 224, 226, and 228 provide access to respective sets of services 166 (FIG. 1). For example, the data storage service interface 222 provides access to the data storage service 168. Likewise, the web documents service interface 224 provides access to a web documents service (within the services 166), the analytics service interface 226 provides access to an analytics service, and the user management service interface 228 provides access to a user management service.

In an example, the particular cloud-based application served by the application sandbox 160 may operate any of the service interfaces 222, 224, 226, and 228 at the application's own option, in accordance with the application's own programming. For example, some cloud-based applications may include their own user management, analytics, and/or web documents, and thus may opt out of using the corresponding services 166 on the backend system 140 in favor of using their own.

It should be understood that nothing in the backend system 140 in any way prevents the existence or management of end users of cloud-based applications that the backend system 140 supports. Indeed, a user management service may expressly be provided. However, any such user management service is decoupled from data storage service 168 accessed through the data storage interface 222. Thus, for example, applications may avail themselves of the user management service (through interface 228) to authenticate end users and authorize them to access various resources. But such user management is provided by the cloud-based application itself, e.g., acting alone or in connection with the user management service. In any case, any such user management service is separate and distinct from the data storage containers 170 managed by the data storage service 168.

In some examples, the application sandbox 160 is configured to generate credentials for particular services upon request. For example, the application sandbox 160 generates each credential based on a key and a secret. Once a credential is generated for a particular service, for example, the credential is thereafter required for accessing that service. Each credential may be selectively scoped to any of the services 166, including to the data storage service 168. Thus, for example, a cloud-based application may request a credential for accessing a particular data storage container 170. The generated credential is agnostic to any end user or application, but the cloud-based application receiving the credential may provide it to any user, group of users, and/or application. Any entity in possession of the credential may then access the data storage container 170 by supplying an access request, which includes both the data storage container's unique ID and the credential.

Considering the data storage interface 222 in additional detail, it is seen that the interface 222 includes sub-interfaces 230, 240, and 250. In an example, data storage containers 170 (FIG. 1) are provided in three distinct types: file, relational, and key-value. Each of the data storage containers 170 is configured for storing one of these three types of data. Other types of data, and/or a greater or fewer number of types of data, may be provided; those shown are merely illustrative. Here, the sub-interfaces 230, 240, and 250 provide access to the data storage service 168 for file-type data, relational-type data, and key-value-type data.

Each of the sub-interfaces 230, 240, and 250 includes a respective "store" service interface (i.e., 232, 242, and 252) for accessing data storage service 168 to create and destroy data storage containers of the respective type, to read and write data storage containers of the respective type, and to maintain their metadata. Each of the sets of sub-interfaces 230, 240, and 250 also includes a respective "push" service interface (i.e., 234, 244, and 254). Each push service interface provides access to the data storage service 168 for pushing changes in contents of underlying data storage containers to one or more subscribing application instances. In addition, the file-type sub-interface 230 includes a file sync service interface 236. The file sync service interface 236 provides access to the data storage service 168 for synchronizing changes in contents of underlying file-type data storage containers among subscribing application instances.

In an example, each data storage container 170 for file-type data may store any number of files and/or folders, organized in any suitable folder structure. The hierarchy may reflect, for example, a folder hierarchy as may be found on a typical Windows or OSX computer.

Each data storage container 170 for relational data may store data in database form. For example, a data storage container 170 storing relational data may store data in schemaless database format, such as in NoSQL format. Rather than having to implement relational databases in the backend system 140, developers may instead operate an SDK (FIG. 1) to define classes and fields specific to their applications. Developers may further operate the SDK to establish relationships among classes and fields, such as one-to-one, one-to-many, many-to-one, and many-to-many. Cloud-based applications may then read and write relational data to the defined fields and classes, and may execute queries and generate reports, without having to deploy relational database solutions.

Each data storage container 170 for key-value data may simply store a key and a corresponding value. For example, a data storage container 170 may store data for a person's first name by specifying a key, e.g., "FirstName," and a corresponding value, e.g., "Phil."

It has thus been described that the application sandbox 160 performs various activities on behalf of a particular cloud-based application. These activities include providing a REST interface 210 to application frontends, housing an application backend 212, and providing interfaces 162 to a variety of backend services 166. The backend services 166 include the data storage service 168 for creating and managing data storage containers 170 for three types of data (file, relational, and key-value), for pushing changes in underlying content to subscribing application instances, and for providing services for synchronizing file-type data across subscribing application instances.

Figure 3A:
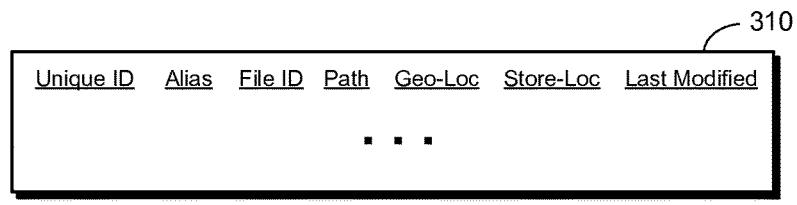
FIGS. 3a-3c are diagrams showing example databases for realizing data storage containers and/or metadata thereof for file-type data, relational data, and key-value data, respectively.
Figure 3B:
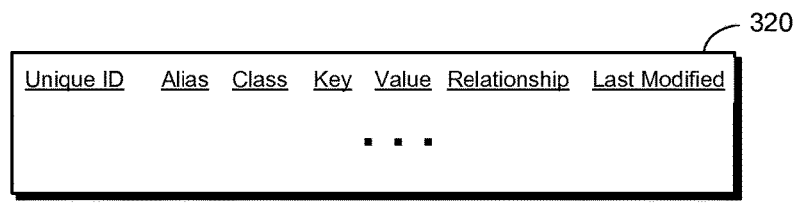
Figure 3C:
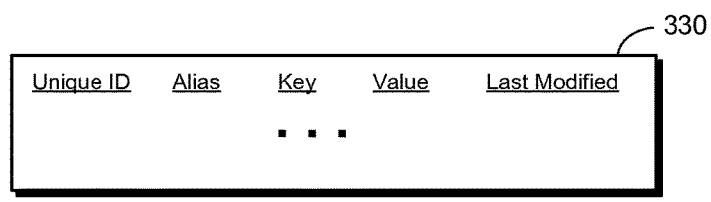

FIGS. 3*a*, 3*b*, and 3*c* show example databases 310, 320, and 330 for storing data and/or metadata for file-type data storage containers, relational-type data storage containers, and key-value-type data storage containers, respectively. In an example, the databases 310, 320, and 330 are realized in the memory 150 of the backend system 140 and are accessible by the data storage services 168. In some examples, certain of the databases 310, 320, and 330 store contents of particular data storage containers 170 as well as metadata describing their contents, although this is not required. In addition, the databases 310, 320, and 330 may be realized in any number or type of database structures. For example, the databases 310, 320, and 330 may be provided together in a single database or separately in multiple databases.

FIG. 3*a* shows the database 310 for storing metadata for file-type data storage containers. In an example, each row of the database 310 (rows are indicated with ellipsis) stores metadata pertaining to a respective file-type data storage container, which may contain a respective file or folder. In an example, the database 310 organizes metadata for file-type data storage containers in the following fields:

"Unique ID." The unique ID that the data storage services 168 have generated for the data storage container represented in the current row. In an example, each file has a unique ID and each folder has a unique ID. No two rows have the same unique ID.

"Alias." A developer-assigned alphanumeric name, which may be used in place of the Unique ID when accessing the data storage container. In an example, a request to create a data storage container (like the request 116*a*) includes a parameter that specifies an alias as alphanumeric text. When creating a data storage container in response to the request, the data storage services 168 store the alias as metadata in the database 310 in connection with the data storage container, such that subsequent accesses to the data storage container may specify the alias in place of the unique ID, which may be long and/or difficult to remember.

"File ID." If the current row identifies a file, then the File ID is a hash of the file's contents. If the current row identifies a folder, then the File ID is a hash of the folder's contents. File IDs uniquely identify files and folders based on their contents, and thus may be useful in identifying and removing redundant copies of files and folders.

"Path." A path to the file or folder on the user's machine. In an example, the indicated Path is relative to some designated root location, which has been created on the user's machine to store application content.

"Geo-Loc." Geolocation information (if available) of the device that created the data storage container represented in the current row. Geo-Loc may include, for example, GPS coordinates of the user's machine at the time the container was created, as well as a timestamp.

"Store-Loc." The location of the file or folder described by the current row in physical or logical storage. The Store-Loc thus provides a way of accessing the underlying contents of the file or folder from one or more storage devices (e.g., disk drives).

"Last Modified" timestamp. The last date and time that the data storage service 168 last modified the file or folder described by the current row.

Those skilled in the art will recognize that the database 310 may be structured in a variety of ways and may include a variety of fields, including fields that are different from those shown and described.

FIG. 3b shows a database 320 for relational-type data storage containers. The database 320 may include fields for "Unique ID," "Alias," and "Last Modified," which are similar to the like-named fields described in connection with the database 310. Here, however, fields may also be provided for "Class," "Key," "Value," and "Relationship." In an example, a "Class" may represent a table of a database structure being defined for a respective relational-type data storage container. A "Key" may represent a database field within the table, and a "Value" may represents the value to which the "Key" has been set. A "Relationship" may represent how a current field relates to other fields and classes. The table 320 may include additional or different fields, depending on the type of relational data to be stored. Unlike the database 310, which stores locations of underlying content (files and/or folders), the database 320 may store the actual contents of relational data. Thus, in some examples, the database 310 includes both metadata and relational data. In other examples, however, the metadata and relational data may be separated in different databases or data structures.

FIG. 3c shows a database 330 for key-value-type data storage containers. The database 330 may include fields for "Unique ID," "Alias," and "Last Modified," which are similar to the like-named fields described in connection with the database 310. The database 330 may also include fields for "Key" and "Value," which hold keys and respective values of key-value pairs stored in the key-value-type data storage containers. As with the database 320, the database 330 may store both metadata and data. Alternatively, the metadata and data may be stored separately.

Figure 4:
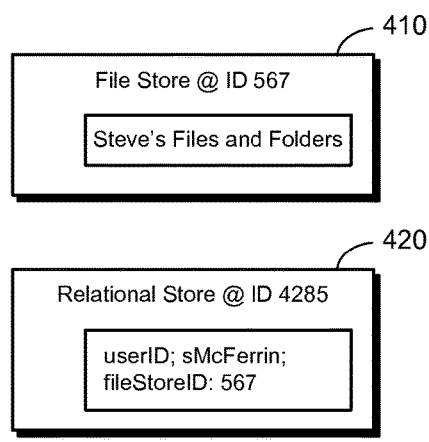
FIG. 4 is a block diagram showing an example arrangement in which a first data storage container stores files of an end user and a second data storage container stores both a user ID of the end user and a unique ID of the first data storage container.

FIG. 4 shows an example of one data storage container storing information about another. Here, a cloud-based application creates a file-type data storage container 410 at unique ID 567 and stores therein files and folders belonging to a user, "Steve." The cloud-based application also creates a relational-type data storage container 420 at unique ID 4285 and stores therein two key-value pairs. A first key-value pair associates a "userID" key with a corresponding value, "sMcFerrin," and a second key-value pair associates a "fileStoreID" key with a corresponding value, "567." In an example, the data storage service 168 writes this key-value data to the data storage container 420 in response to a user storage request directed to the second data storage container 420. In accordance with its programming, the cloud-based application may interpret these key-value pairs to mean that the unique ID for the file-type data storage container belonging to "sMcFerrin" is "567." This example thus shows how a cloud-based application can use inherently user-agnostic data storage containers to store data that assists with user management.

Figure 5:
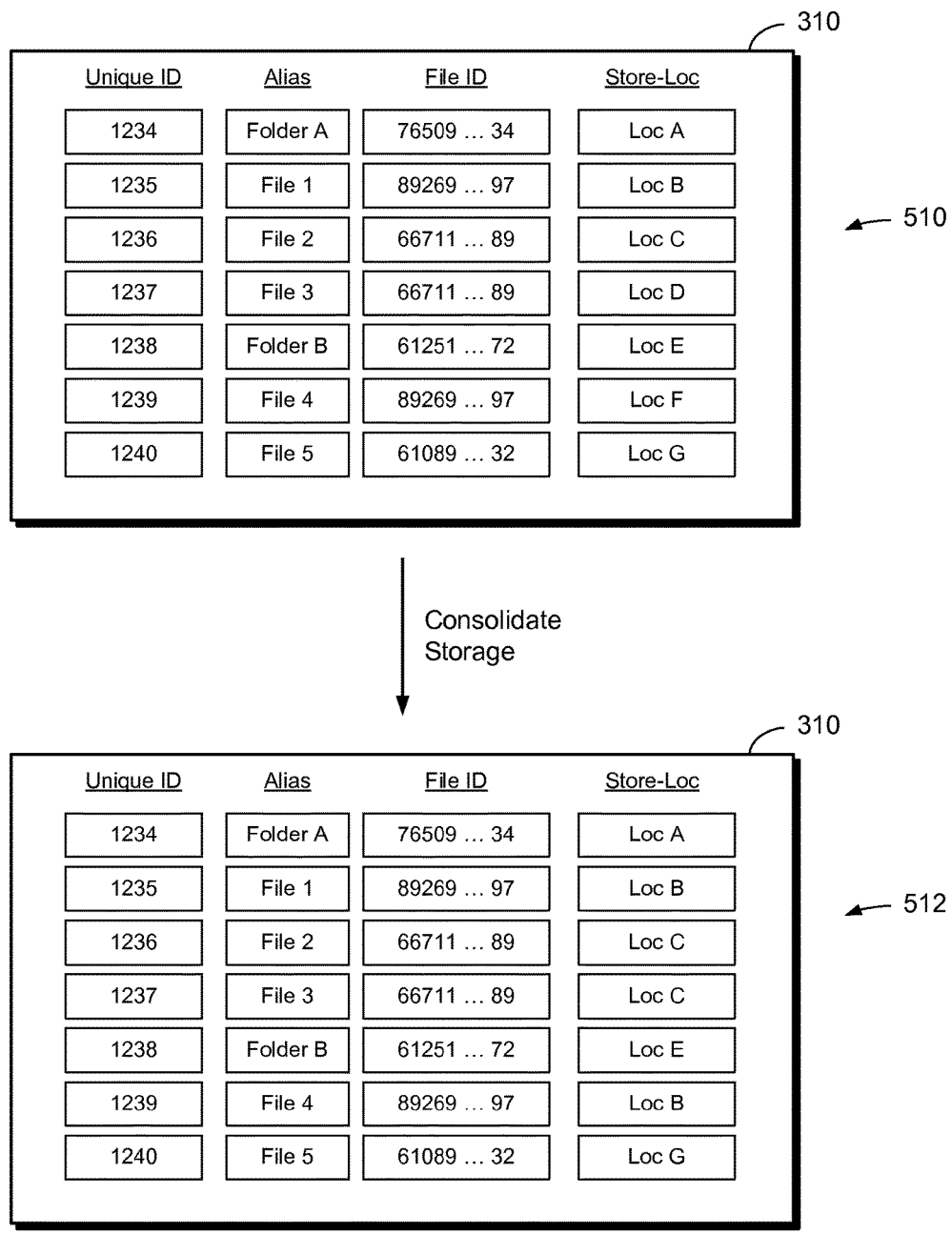
FIG. 5 is a block diagram showing an example arrangement for removing redundant copies of data storage containers.

FIG. 5 shows an example arrangement for consolidating storage of file-type data stored in different file-type data storage containers, thus making more efficient use of back-end storage. The illustrated arrangement shows portions of the database 310 (FIG. 3a). Certain fields and entries of the database 310 have been omitted from FIG. 5 for the sake of simplicity. The arrangement of FIG. 5 shows the storage of metadata for file-type data storage containers both in a first state 510, before removing redundant storage, and in a second state 512, after removing redundant storage.

As seen in the first state 510, the database 310 includes metadata for seven file-type data storage containers having consecutive Unique IDs ranging from 1234 to 1240. Some of the illustrated data storage containers store files while others store folders. Each data storage container has a respective Alias, File ID, and Store-Loc, where the File ID provides a hash of the contents of the data storage container and the Store-Loc provides a location on physical media (e.g., disk) of those contents. In this first state 510, each data storage container has a different value of Store-Loc, indicating that each data storage container consumes its own respective back-end storage.

In accordance with further improvements hereof, the data storage service 168 searches the database 310 to find duplicate file content and performs consolidation operations to liberate backend storage if any duplicate content is found. As the File ID provides a hash of a data storage container's contents, the data storage service 168 can compare hash values as an efficient proxy for comparing content. The data storage service 168 thus searches the database 310 for matching values of File ID. For any matches that are found, the data storage service 168 liberates the backend storage of each redundant copy and changes the Store-Loc field of each redundant copy to reflect the physical storage location of the single retained copy.

For example, as shown in the second state 512, the data storage service 168 has changed the Store-Loc value for Unique ID 1237 (alias "File 3") to match that of Unique ID 1236 (alias "File 2"). This change reflects the fact that the data storage service 168 has found a match between the contents of File 3 and those of File 2, as indicated by their matching File IDs. Likewise, the data storage service 168 has changed the Store-Loc value for Unique ID 1239 (alias "File 4) to match that of Unique ID 1235 (alias "File 1"). This change reflects the data storage service 168 having found a match between the contents of File 4 and those of File 1. In this example, the data storage service 168 has freed the backend storage found at Loc D and Loc F, which is no longer needed to support storage of File 3 and File 4. The data storage service 168 may repurpose the freed storage to support storage of other data.

The scope of the above-described process of consolidating redundant storage may be varied and may be controlled by the developer. For example, a developer may expressly limit the scope of consolidation services to (1) a set of data storage containers, (2) a particular cloud-based application, or (3) a set of cloud-based applications, for example. Consolidation then operates within the designated scope but not outside it. For example, if the scope of consolidation is limited to a particular cloud-based application, then the data storage service 168 may search for and free redundant backend storage for file-based data storage containers created by that cloud-based application, but not in data storage containers created by other cloud-based applications.

Figure 6:
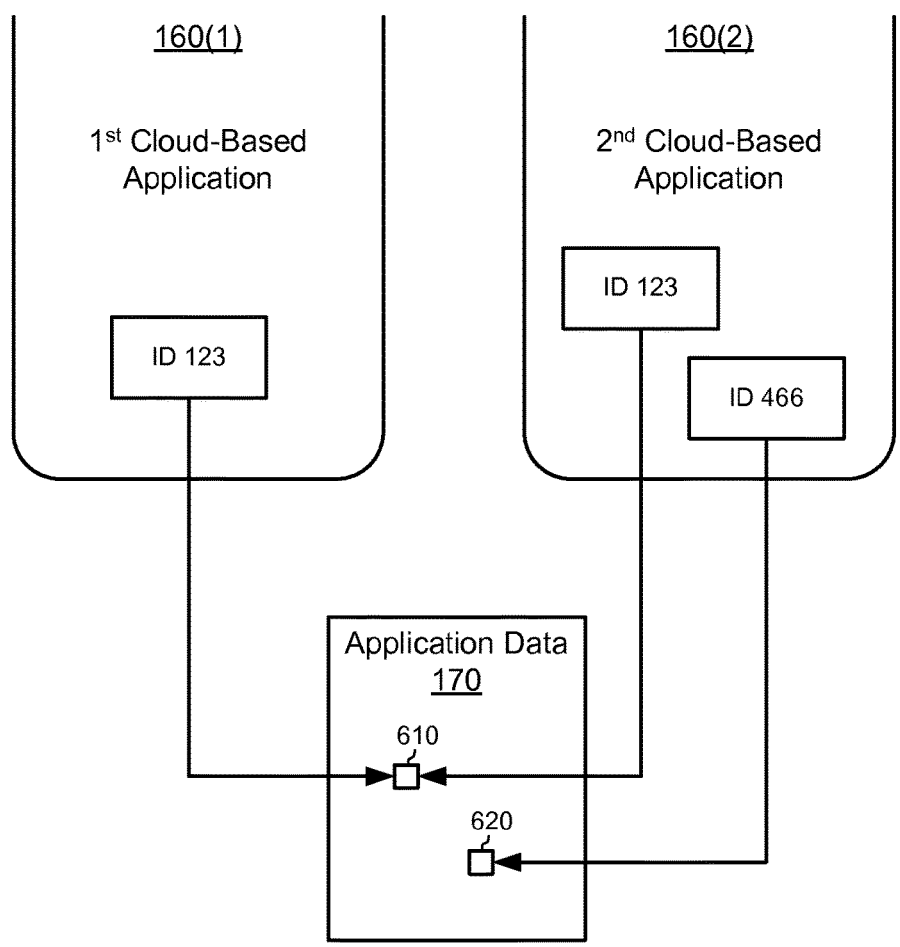
FIG. 6 is a block diagram showing an example arrangement in which a data storage container is accessed from multiple cloud-based applications.

FIG. 6 shows an example arrangement in which a data storage container may be shared among different cloud-based applications served from respective application sandboxes. Here, a first cloud-based application served by application sandbox 160(1) has access to a data storage container 610 at unique ID 123. At the same time, a second cloud-based application served by application sandbox 160(2) has access to the same data storage container 610 at unique ID 123. The second cloud-based application may further have access to another data storage container 620 at unique ID 466. Both the first cloud-based application and the second cloud-based application can thus read and write contents of the data storage container 610 via respective read and write requests. Although each data storage container is typically created by a respective cloud-based application served by a respective application sandbox, the creating application may engage in a protocol with another application to grant the other application access to the data storage container. Thus, in this example, the data storage container 610 is not only user-agnostic, but also application agnostic, as it may be accessed from multiple cloud-based applications served by respective application sandboxes.

Figure 7:
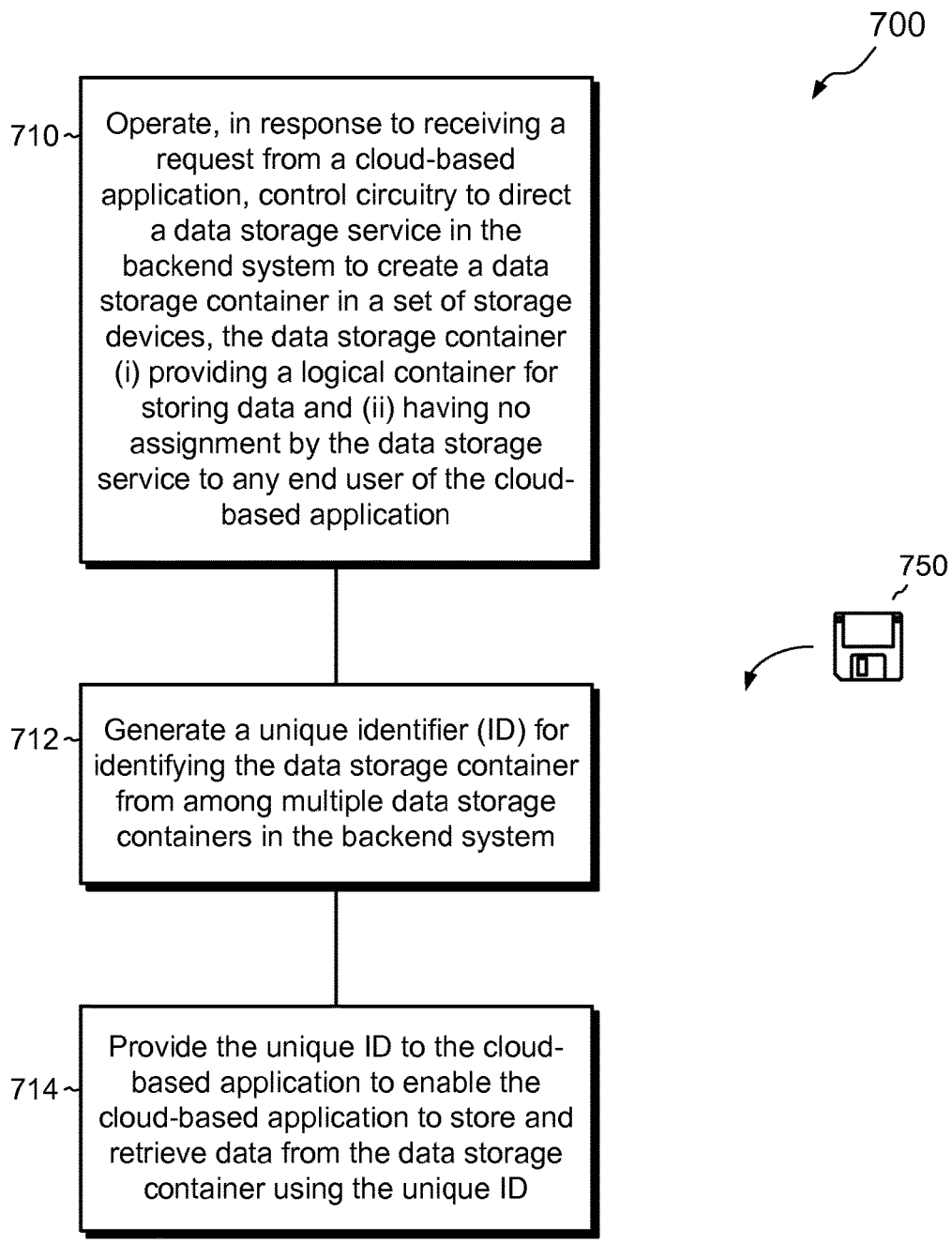
FIG. 7 is a flowchart showing an example process for managing data storage in a backend system that provides services for supporting cloud-based software applications.

FIG. 7 shows a process 700 that may be carried out in connection with the computing environment 100. The process 700 is typically performed by the software constructs described in connection with FIGS. 1 and 2, which reside in the memory 150 of the backend system 140 and are run by the set of processors 144. The various acts of the process 700 may be ordered in any suitable way. Accordingly, embodiments may be constructed in which acts are performed in orders different from those illustrated, which may include performing some acts simultaneously, even though the acts are shown as sequential in the illustrated embodiments.

At 710, in response to receiving a request from a cloud-based application, control circuitry is operated to direct a data storage service in the backend system to create a data storage container in a set of storage devices. The data storage container provides a logical container for storing data and has no assignment by the data storage service to any end user of the cloud-based application. For example, a request is received from a frontend client running on one of the machines 110 or 120, an application backend 212, or a service running within the backend system 140 itself. The request directs the data storage service 168 to create a data storage container (e.g., 170a). The data storage container is a logical container (e.g., defined by metadata) for storing data and has no assignment by the data storage service 168 to any end user of the cloud-based application. Rather, the data storage container is user-agnostic.

At 712, a unique identifier (ID) is generated for identifying the data storage container from among multiple data storage containers in the backend system. For example, the data storage service 168 may generate the unique ID as an automatically incrementing integer, as a result of a hash function, or in some other manner.

At 714, the unique ID is provided to the cloud-based application to enable the cloud-based application to store and retrieve data from the data storage container using the unique ID. For example, the unique ID 116b may be returned to a frontend client on one of the machines 110 or 120, may be returned to the application backend 212, or may be sent to some other location where the cloud-based application may retrieve it.

An improved technique has been described that provides data storage services in the cloud agnostically to any user account or identity through the use of data storage containers, which are accessed using unique identifiers and independently of any user-based context. A data storage service 168 run in a backend system 140 and creates a data storage container (e.g., 170a) along with a unique ID (e.g., 116b) that identifies the data storage container 170a from among multiple such containers 170. The data storage service 168 provides the unique ID 116b to a cloud-based application, which may then write data to and/or read data from the data storage container 170a. Once the cloud-based application receives the unique ID 116b, the cloud-based application may itself assign the data storage container 170a to any user, or to no user, in accordance with the cloud-based application's own programming. But any such assignment to a user is made by the cloud-based application at its own option and not by the data storage service. Thus, the improved technique effectively decouples the data storage services in the cloud from any user-based context, allowing developers to design applications that include data storage services without having to build their own solutions or to require users to separately log on.

Having described certain embodiments, numerous alternative embodiments or variations can be made. For example, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 750 in FIG. 7). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of managing data storage in a backend system that provides services for supporting cloud-based software applications, the method comprising:

in response to receiving a request from a cloud-based application, operating control circuitry to direct a data storage service in the backend system to create a particular data storage container in a set of storage devices;

generating a unique identifier (ID) for identifying the particular data storage container from among multiple data storage containers in the backend system, each of the multiple data storage containers (i) providing a logical container for storing data and (ii) having no assignment by the data storage service to any end user of the cloud-based application; and providing the unique ID to the cloud-based application to enable the cloud-based application to store and retrieve data from the particular data storage container using the unique ID, wherein each data storage container has a respective file identifier and a respective storage location, each file identifier providing a hash of contents of the respective data storage container, each storage location providing a respective physical storage location of the contents on physical media, and wherein the method further comprises:

identifying duplicate copies of files stored across different data storage containers by comparing the file identifier of one data storage container with the file identifiers of other data storage containers and finding at least one matching data storage container from among the other data storage container, each matching data storage container having a file identifier that matches the file identifier of the one data storage container; and changing the storage location of each matching data storage container to reflect the physical storage location of the one data storage container.

2. The method of claim 1, further comprising storing data in the particular data storage container in response to receiving a storage request from the cloud-based application, the storage request specifying a set of data to be stored in the particular data storage container and the unique ID of the particular data storage container.

3. The method of claim 2, wherein the set of data includes an application setting of the cloud-based application, the application setting not pertaining to any particular user of the cloud-based application.

4. The method of claim 3, further comprising:

creating a second data storage container in the backend system, the second data storage container (i) providing a logical container for storing data and (ii) having no assignment by the data storage service to any end user of the cloud-based application;

generating a unique identifier (ID) for identifying the second data storage container from among multiple data storage containers in the backend system;

receiving a user storage request from the cloud-based application, the user storage request specifying data to be stored in the second data storage container and the unique ID of the second data storage container, the data to be stored in the second data storage container including a user ID of an end user of the cloud-based application and the unique ID of the particular data storage container; and in response to receiving the user storage request, storing the user ID of the end user and the unique ID of the particular data storage container in the second data storage container to effect an assignment of the particular data storage container to the end user by the cloud-based application.

5. The method of claim 2, wherein the cloud-based application is a first cloud-based application, and wherein the method further comprises:

providing the unique ID to a second cloud-based application, the second cloud-based application being a different software application from the first cloud-based application;

reading data from the particular data storage container in response to receiving a read request from the second cloud-based application, the read request specifying the unique ID of the particular data storage container; and returning the data read to the second cloud-based application.

6. The method of claim 2, further comprising configuring the particular data storage container to store one of (i) file-type data, (ii) relational data, or (iii) key-value data.

7. The method of claim 6, further comprising:

generating a credential for accessing contents of the particular data storage container in the backend system and providing the credential to the cloud-based application;

receiving an access request from the cloud-based application to access the contents of the particular data storage container, the access request including the unique ID of the particular data storage container and the credential; and in response to verifying the credential received in connection with the access request, granting the cloud-based application access to the contents of the particular data storage container.

8. The method of claim 6, wherein the request from the cloud-based application to create the particular data storage container in the backend system includes a parameter specifying an alphanumeric alias for the unique ID, wherein operating the processing circuitry to create the particular data storage container includes storing the alphanumeric alias as metadata in connection with the particular data storage container, and wherein receiving the storage request specifying the unique ID of the particular data storage container includes receiving the unique ID indirectly in the form of the alphanumeric alias.

9. The method of claim 1, wherein the request from the cloud-based application is received over a network from a machine distinct from the backend system.

10. A backend system that provides services for supporting cloud-based software applications, the backend system comprising:

control circuitry and a set of storage devices coupled the control circuitry, the control circuitry constructed and arranged to:

direct a data storage service in the backend system to create, in response to receiving a request from a cloud-based application, a data storage container in the set of storage devices of the backend system, the data storage container (i) providing a logical container for storing data and (ii) having no assignment by the data storage service to any end user of the cloud-based application;

generate a unique identifier (ID) for identifying the data storage container from among multiple data storage containers in the backend system; and provide the unique ID to the cloud-based application to enable the cloud-based application to store and retrieve data from the data storage container using the unique ID, wherein the control circuitry is further constructed and arranged to:

create a second data storage container in the backend system, the second data storage container (i) providing a logical container for storing data and (ii) having no assignment by the data storage service to any end user of the cloud-based application;

generate a unique identifier (ID) for identifying the second data storage container from among multiple data storage containers in the backend system;

receive a user storage request from the cloud-based application, the user storage request specifying data to be stored in the second data storage container and the unique ID of the second data storage container, the data to be stored in the second data storage container including a user ID of an end user of the cloud-based application and the unique ID of the first data storage container; and in response to receiving the user storage request, store the user ID of the end user and the unique ID of the first data storage container in the second data storage container to effect an assignment of the first data storage container to the end user by the cloud-based application.

11. The backend system of claim 10, wherein the control circuitry is further constructed arranged to store, in the data storage container, a set of data providing an application setting of the cloud-based application, the application setting not pertaining to any particular user of the cloud-based application.

12. A non-transitory computer-readable medium including instructions which, when executed by control circuitry, cause the control circuitry to perform a method for managing data storage in a backend system that provides services for supporting cloud-based software applications, the method comprising:
  in response to receiving a request from a cloud-based application, directing a data storage service in the backend system to create a data storage container in a set of storage devices, the data storage container (i) providing a logical container for storing data and (ii) having no assignment by the data storage service to any end user of the cloud-based application;
  generating a unique identifier (ID) for identifying the data storage container from among multiple data storage containers in the backend system; and
  providing the unique ID to the cloud-based application to enable the cloud-based application to store and retrieve data from the data storage container using the unique ID,
  wherein the method further comprises configuring the data storage container to store one of (i) file-type data, (ii) relational data, or (iii) key-value data,
  wherein the request from the cloud-based application to create the data storage container in the backend system includes a parameter specifying an alphanumeric alias for the unique ID,
  wherein creating the data storage container includes storing the alphanumeric alias as metadata in connection with the data storage container, and
  wherein the method further comprises storing data in the data storage container in response to receiving a storage request from the cloud-based application, the storage request specifying a set of data to be stored in the data storage container and the alphanumeric alias of the data storage container.

13. The non-transitory computer-readable medium of claim 12, wherein the method further comprises storing, in the data storage container, a set of data providing an application setting of the cloud-based application, the application setting not pertaining to any particular user of the cloud-based application.

14. The non-transitory computer-readable medium of claim 13, wherein the method further comprises:
  creating a second data storage container in the backend system, the second data storage container (i) providing a logical container for storing data and (ii) having no assignment by the data storage service to any end user of the cloud-based application;
  generating a unique identifier (ID) for identifying the second data storage container from among multiple data storage containers in the backend system;
  receiving a user storage request from the cloud-based application, the user storage request specifying data to be stored in the second data storage container and the unique ID of the second data storage container, the data to be stored in the second data storage container including a user ID of an end user of the cloud-based application and the unique ID of the first data storage container; and
  in response to receiving the user storage request, storing the user ID of the end user and the unique ID of the first data storage container in the second data storage container to effect an assignment of the first data storage container to the end user by the cloud-based application.

15. The non-transitory computer-readable medium of claim 12, wherein the cloud-based application is a first cloud-based application, and wherein the method further comprises:
  providing the unique ID to a second cloud-based application, the second cloud-based application being a different software application from the first cloud-based application;
  reading data from the data storage container in response to receiving a read request from the second cloud-based application, the read request specifying the unique ID of the data storage container; and
  returning the data read to the second cloud-based application.

16. The non-transitory computer-readable medium of claim 12, wherein the method further comprises:
  creating at least one additional data storage container in the backend system, each additional data storage container (i) providing a respective logical container for storing data and (ii) having no assignment by the data storage service to any end user of the cloud-based application;
  storing a set of files in each additional data storage container;
  identifying duplicate copies of files stored across different data storage containers;
  freeing backend storage for all but one copy of each file for which duplicate copies are found; and
  adjusting metadata of the duplicate copies to point to a storage location of the one copy that remains.

17. The non-transitory computer-readable medium of claim 12, wherein the method further comprises:
  generating a credential for accessing contents of the data storage container in the backend system and providing the credential to the cloud-based application;
  receiving an access request from the cloud-based application to access the contents of the data storage container, the access request including the unique ID of the data storage container and the credential; and
  in response to verifying the credential received in connection with the access request, granting the cloud-based application access to the contents of the data storage container.

* * * * *